US006486253B1

(12) United States Patent
Gilmer et al.

(10) Patent No.: US 6,486,253 B1
(45) Date of Patent: Nov. 26, 2002

(54) POLYMER/CLAY NANOCOMPOSITE HAVING IMPROVED GAS BARRIER COMPRISING A CLAY MATERIAL WITH A MIXTURE OF TWO OR MORE ORGANIC CATIONS AND A PROCESS FOR PREPARING SAME

(75) Inventors: John Walker Gilmer, Kingsport, TN (US); Robert Boyd Barbee, Kingsport, TN (US); James Christopher Matayabas, Jr., Chandler, AZ (US); Tie Lan, Lake Zurich, IL (US)

(73) Assignee: University of South Carolina Research Foundation, Columbia, SC (US)

( * ) Notice: Subject to any disclaimer, the term of this patent is extended or adjusted under 35 U.S.C. 154(b) by 0 days.

(21) Appl. No.: 09/451,549

(22) Filed: Dec. 1, 1999

(51) Int. Cl.$^7$ .................................. C08K 3/34

(52) U.S. Cl. .................. 524/445; 428/333; 428/338; 428/339; 523/210; 524/446; 524/447

(58) Field of Search .................. 428/333, 338, 428/339; 523/210; 524/445, 446, 447; 501/148

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,876,552 A | 4/1975 | Moynihan |
| 3,879,283 A | 4/1975 | Mercade |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | 9/1978 | Finlayson |
| 4,133,802 A | 1/1979 | Hachiboshi et al. |
| 4,161,578 A | 7/1979 | Herron |
| 4,163,002 A | 7/1979 | Pohl et al. |
| 4,208,218 A | 6/1980 | Finlayson |
| 4,219,527 A | 8/1980 | Edelman et al. |
| 4,239,826 A | 12/1980 | Knott, II et al. |
| 4,391,637 A | 7/1983 | Mardis et al. |
| 4,393,007 A | 7/1983 | Priester et al. |
| 4,398,642 A | 8/1983 | Okudaria et al. |
| 4,410,364 A | 10/1983 | Finlayson et al. |
| 4,412,018 A | 10/1983 | Finlayson et al. |
| 4,429,079 A | 1/1984 | Shibata et al. |
| 4,434,075 A | 2/1984 | Mardis et al. |
| 4,434,076 A | 2/1984 | Mardis et al. |
| 4,442,163 A | 4/1984 | Kühner et al. |
| 4,450,095 A | 5/1984 | Finlayson |
| 4,472,538 A | 9/1984 | Kamigaito et al. |
| 4,482,695 A | 11/1984 | Barbee et al. |
| 4,517,112 A | 5/1985 | Mardis et al. |
| 4,536,425 A | 8/1985 | Hekal |
| 4,546,126 A | 10/1985 | Breitenfellner et al. |
| 4,595,715 A | 6/1986 | Kuze et al. |
| 4,600,409 A | 7/1986 | Campbell |
| 4,646,925 A | 3/1987 | Nohara |
| 4,676,929 A | 6/1987 | Rittler |
| 4,677,158 A | 6/1987 | Tso et al. |
| 4,680,208 A | 7/1987 | Aoki et al. |
| 4,720,420 A | 1/1988 | Crass et al. |
| 4,725,466 A | 2/1988 | Crass et al. |
| 4,739,007 A | 4/1988 | Okada et al. |
| 4,742,098 A | 5/1988 | Finlayson et al. |
| 4,769,078 A | 9/1988 | Tso |
| 4,777,206 A | 10/1988 | Rittler |
| 4,810,734 A | 3/1989 | Kawasumi et al. |
| 4,889,885 A | 12/1989 | Usuki et al. |
| 4,894,411 A | 1/1990 | Okada et al. |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |
| EP | 0202532 | 11/1986 |
| EP | 261430 | 3/1988 |

(List continued on next page.)

OTHER PUBLICATIONS

US 5,336,241, 8/1994, Jordan (withdrawn)
LeBaron et al., "Polymer–layered silicate nanocomposites: an overview," *App. Clay Sci.*, 15, 11–29 (1999).
Ke et al., "Crystallization, Properties, and Crystal and Nanoscale Morphology of PET–Clay Nanocomposites," *J. Appl. Polym. Sci.*, 71, 1139—1146 (1999).

(List continued on next page.)

Primary Examiner—Edward J. Cain
(74) Attorney, Agent, or Firm—Troutman Sanders LLP; Todd Deveau

(57) ABSTRACT

This invention relates to a polymer-clay nanocomposite having an improved gas permeability comprising (i) a melt-processible matrix polymer, and incorporated therein (ii) a layered clay material intercalated with a mixture of at least two organic cations. The invention also relates to processes for preparing a nanocomposite and articles produced from a nanocomposite.

42 Claims, No Drawings

U.S. PATENT DOCUMENTS

| | | | |
|---|---|---|---|
| 4,946,365 A | 8/1990 | Kudert et al. | |
| 4,957,980 A | 9/1990 | Kobayashi et al. | |
| 4,983,432 A | 1/1991 | Bissot | |
| 4,983,719 A | 1/1991 | Fox et al. | |
| 4,994,313 A | 2/1991 | Shimizu et al. | |
| 5,028,462 A | 7/1991 | Matlack et al. | |
| 5,037,285 A | 8/1991 | Kudert et al. | |
| 5,091,462 A | 2/1992 | Fukui et al. | |
| 5,102,948 A | 4/1992 | Deguchi et al. | |
| 5,110,501 A | 5/1992 | Knudson, Jr. et al. | |
| 5,149,485 A | 9/1992 | Belcher | |
| 5,153,061 A | 10/1992 | Cavagna et al. | |
| 5,153,062 A | 10/1992 | Grolig et al. | |
| 5,164,440 A | 11/1992 | Deguchi et al. | |
| 5,164,460 A | 11/1992 | Yano et al. | |
| 5,206,284 A | 4/1993 | Fukui et al. | |
| 5,221,507 A | 6/1993 | Beck et al. | |
| 5,248,720 A | 9/1993 | Deguchi et al. | |
| 5,273,706 A | 12/1993 | Laughner | |
| 5,314,987 A | 5/1994 | Kim et al. | |
| 5,336,647 A | 8/1994 | Naé et al. | |
| 5,340,884 A | 8/1994 | Mills et al. | |
| 5,374,306 A | 12/1994 | Schlegel et al. | |
| 5,382,650 A | 1/1995 | Kasowski et al. | |
| 5,385,776 A | 1/1995 | Maxfield et al. | |
| 5,414,042 A | 5/1995 | Yasue et al. | |
| 5,429,999 A | 7/1995 | Naé et al. | |
| 5,434,000 A | 7/1995 | Konagaya et al. | |
| 5,514,734 A | 5/1996 | Maxfield et al. | |
| 5,523,045 A | 6/1996 | Kudert et al. | |
| 5,530,052 A | 6/1996 | Takekoshi et al. | |
| 5,552,469 A | 9/1996 | Beall et al. | |
| 5,578,672 A | 11/1996 | Beall et al. | |
| 5,612,138 A | 3/1997 | Kurz et al. | |
| 5,620,774 A | 4/1997 | Etchu et al. | |
| 5,648,159 A | 7/1997 | Sato | |
| 5,665,454 A | 9/1997 | Hosoi et al. | |
| 5,728,764 A | 3/1998 | Bauer et al. | |
| 5,747,560 A | 5/1998 | Christiani et al. | |
| 5,780,376 A | 7/1998 | Gonzales et al. | |
| 5,807,630 A | 9/1998 | Chrstie et al. | |
| 5,830,544 A | 11/1998 | Kerscher et al. | |
| 5,849,830 A | 12/1998 | Tipursky et al. | |
| 5,876,812 A | 3/1999 | Frisk et al. | |
| 5,882,751 A | 3/1999 | Occhiello et al. | |
| 5,916,685 A | 6/1999 | Frisk | |
| 5,942,320 A | 8/1999 | Miyake et al. | |
| 5,972,448 A | 10/1999 | Frisk et al. | |
| 6,050,509 A | 4/2000 | Clarey et al. | |
| 6,057,396 A | 5/2000 | Lan et al. | |
| 6,071,988 A * | 6/2000 | Barbee et al. | 523/210 |
| 6,084,019 A * | 7/2000 | Matabayas, Jr. et al. | 524/445 |
| 6,156,835 A | 12/2000 | Anderson et al. | |
| 6,232,388 B1 | 5/2001 | Lan et al. | |
| 6,254,803 B1 | 7/2001 | Matthews et al. | |

FOREIGN PATENT DOCUMENTS

| | | |
|---|---|---|
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 846723 | 6/1998 |
| EP | 0846723 | 6/1998 |
| EP | 0 899 301 A1 | 3/1999 |
| EP | 0 909 787 A1 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/02323 | 1/1997 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/38914 | 8/1999 |
| WO | WO 99/41299 | 8/1999 |

OTHER PUBLICATIONS

Kawasumi et al., "Preparation and Mechanical Properties of Polyprolylene–Clay Hybrids," *Macromolecules*, 30, 6333–6338 (1997).

Usuki et al., "Synthesis of Propylene–Clay Hybrid", *J. Appl. Polym. Sci.*, 63, 137–139 (1997).

Giannelis, "Polymer Layered Silicate Nanocomposites," *Advanced Materials*, 8, 29–35 (1996).

Kurokawa et al., "Preparation of a nanocomposite of polypropylene and smectite," *J. Materials Science Letters*, 15, 1481–1483 (1996).

Oriakhi et al., "Incorporation of poly(acrylic acid), poly(vinylsulfonate) and poly(styrenesulfonate) within layered double hydroxides," *J. Mater. Chem.*, 6, 103–107 (1996).

Messersmith et al., "Syntheses and Barrier of Poly($\xi$–Caprolactone)–Layered Silicate Nanocomposites," *J. of Polym. Sci.*, 33, 1047–1057 (1995).

Pinnavaia et al., "Clay–Reinforced Epoxy Nanocomposites," *Chem. Mater.*, 6, 2216–2219 (1994).

Sugahara et al., "Clay–Organic Nano–Composite; Preparation of a Kaolinite—Poly(vinylpyrrolidone) intercalation Compound," *J. Ceramic Society of Japan*, 100, 413–416 (1992).

Yano et al., "Synthesis and properties of polyimide–clay hybrid," *ACS, Polymer Preprints, 32*, 65–66, (1991).

Fukushima et al., "Swelling Behavior of Montmorillonite by Poly–6–Amide," *Clay Minerals, 23*, 27–34 (1988).

Fukushima et al., "Synthesis of an Intercalated Compound of Montmorillonite and 6–Polyamide," *J. Inclusion Phenomena, 5*, 473–482 (1987).

Okada et al., "Synthesis and Characterization of a Nylon 6–Clay Hybrid," *ACS, Polymer Preprints, 28*, 447–448, (1987).

Fahn et al., "Reaction Products of Organic Dye Molecules with Acid–Treated Montmorillonite," *Clay Minerals, 18*, 447–458 (1983).

Greenland, "Adsorption of Polyvinyl Alcohols by Montmorillonite," *J. Colloid Sci., 18*, 647–664 (1963).

MSDS—Polyvinyl Alcohol.

MSDS—Clay (Montmorillonite).

*Encyclopedia of Polymer Science and Engineering*, 2nd Edition. 12, 364–383 (1988).

* cited by examiner

_US 6,486,253 B1_

POLYMER/CLAY NANOCOMPOSITE HAVING IMPROVED GAS BARRIER COMPRISING A CLAY MATERIAL WITH A MIXTURE OF TWO OR MORE ORGANIC CATIONS AND A PROCESS FOR PREPARING SAME

RELATED APPLICATION

This application claims priority to U.S. provisional patent application Serial No. 60/111,199, filed Dec. 7, 1998, which is incorporated herein by this reference in its entirety.

FIELD OF THE INVENTION

This invention relates generally to a polymer-clay nanocomposite having improved gas barrier comprising a clay material intercalated with a mixture of organic cations. This invention further relates to articles produced from the nanocomposite, and a process for preparing a nanocomposite.

BACKGROUND OF THE INVENTION

There is much interest in layered clay-based polymer nanocomposites because of the improved properties exhibited by the nanocomposites. It is desirable to maximize delamination of the layered clay material into individual platelet particles in order to maximize some property improvements, including barrier (gas permeability) improvements, and to minimize deleterious effects on some properties including elongation-at-break. Ideally, the clay material is exfoliated into platelet particles with a thickness of less than about 20 nm in order to achieve clarity that is comparable to the clay-free polymer. To date, the only polymer/clay nanocomposites that meet this expectation are prepared by incorporation of organically treated clays during synthesis of the polymer from monomer. It is widely known, however, that the amount of clay that can be admixed in a polymer and still exhibit exfoliation of the layered clay is limited and some mechanical properties, such as elongation-at-break, are often reduced considerably upon the addition of the clay.

Researchers recognized the value of inventing melt-compounding processes that provide exfoliated clay composites. Namely, melt-compounding processes provide more versatility of polymer choice and clay loading and the potential for cost savings. However, with many polymer/clay mixtures, the melt compounding processes explored to date do not provide sufficient exfoliation of the platelet particles.

Polyesters such as poly(ethylene terephthalate) (PET) are widely used in bottles and containers which are used for carbonated beverages, fruit juices, and certain foods. Useful polyesters have high inherent viscosity (I.V.), which allows polyesters to be formed into parisons and subsequently molded into containers. Because of the limited barrier properties to oxygen, carbon dioxide and the like, PET containers are not generally used for products requiring long shelf life. For example, oxygen transmission into PET bottles which contain beer, wine and certain food products causes these products to spoil. There have been attempts to improve the barrier properties of PET containers by the use of multilayer structures comprising one or more barrier layers and one or more structural layers of PET. However, multilayer structures have not found wide use and are not suitable for use as a container for beer due to the high cost, the large thickness of the barrier layer required, and poor adhesion of the barrier layer to the structural layer.

There are many examples in the patent literature of polymer/clay nanocomposites prepared from monomers and treated clays. For example, U.S. Pat. No. 4,739,007 discloses the preparation of Nylon-6/clay nanocomposites from caprolactam and alkyl ammonium-treated montmorillonite. U.S. Pat. No. 4,889,885 describes the polymerization of various vinyl monomers such as methyl methacrylate and isoprene in the presence of sodium montmorillonite.

Some patents describe the blending of up to 60 weight percent of intercalated clay materials with a wide range of polymers including polyamides, polyesters, polyurethanes, polycarbonates, polyolefins, vinyl polymers, thermosetting resins and the like. Such high loadings with modified clays are impractical and useless with most polymers because the melt viscosities of the blends increase so much that they cannot be molded.

WO 93/04117 discloses a wide range of polymers melt blended with up to 60 weight percent of dispersed platelet particles. WO 93/04118 discloses nanocomposite materials of a melt processable polymer and up to 60 weight percent of a clay that is intercalated with organic onium salts. The use of clays intercalated with a mixture of onium ions is not contemplated or disclosed.

U.S. Pat. No. 5,552,469 describes the preparation of intercalates derived from certain clays and water soluble polymers such as polyvinyl pyrrolidone, polyvinyl alcohol, and polyacrylic acid. The use of clays intercalated with organic cations is specifically excluded.

JP Kokai patent no. 9-176461 discloses polyester bottles wherein the polyester contains umnodified sodium montmorillonite. Incorporation of the clay into the polyester by melt compounding is disclosed; however, the use of clays intercalated with a mixture of organic cations is neither contemplated nor disclosed.

Clays intercalated with a mixture of organic cations, typically onium ions, are used as rheology modifiers for certain coating applications; however, their use in polymer/clay nanocomposites has been neither contemplated nor disclosed. The following references are of interest with regard to chemically modified organoclay (clay/organic cation intercalate) materials: U.S. Pat. Nos. 4,472,538; 4,546,126; 4,676,929; 4,739,007; 4,777,206; 4,810,734; 4,889,885; 4,894,411; 5,091,462; 5,102,948; 5,153,062; 5,164,440; 5,164,460; 5,248,720; 5,382,650; 5,385,776; 5,414,042; 5,552,469; WO Pat. Application Nos. 93/04117; 93/04118; 93/11190; 94/11430; 95/06090; 95/14733; D. J. Greenland, J. Colloid Sci. 18, 647 (1963); Y. Sugahara et al., J. Ceramic Society of Japan 100, 413 (1992); P. B. Massersmith et al., J. Polymer Sci.: Polymer Chem., 33, 1047 (1995); C. O. Sriakhi et al., J. Mater. Chem. 6, 103(1996).

Therefore, as shown above, a need still exists for a polymer nanocomposite comprising a clay material and articles produced therefrom that have improved barrier properties.

SUMMARY OF THE INVENTION

It has been found that clays intercalated with a mixture of organic cations, preferably onium ions, are useful for the preparation by a melt compounding process of a polymer/clay nanocomposite with sufficient exfoliation and molecular weight for improved properties and clarity for commercial applications, including film, bottles, and containers. The polymer nanocomposite of this invention is particularly useful for forming packages that have improved gas. barrier properties. Containers made from these polymer composite materials are ideally suited for protecting consumable products, such as foodstuffs, soft drinks, and medicines.

This invention also seeks to provide a cost-effective method for producing barrier layers with sufficient oxygen barrier and clarity for wide spread applications as multilayer bottles and containers, including beer bottles.

In accordance with the purpose(s) of this invention, as embodied and broadly described herein, this invention, in one embodiment, relates to a polymerclay nanocomposite having an improved gas permeability comprising (i) a melt-processible matrix polymer, and incorporated therein (ii) a layered clay material intercalated with a mixture of at least two organic cations.

In another embodiment, this invention relates to a process for preparing a polymer-clay nanocomposite comprising (i) preparing an intercalated layered clay material by reacting a swellable layered clay material with a mixture of at least two organic cations, and (ii) incorporating the intercalated clay material in a matrix polymer by melt processing the matrix polymer with the intercalated clay.

In yet another embodiment, this invention relates to a process for preparing a polymer-clay nanocomposite having an improved gas permeability comprising the steps of: (i) preparing an intercalated layered clay material by reacting a swellable layered clay material with a mixture of at least two organic cations, (ii) adding the clay material to components for forming a polymer, and (iii) conducting the polycondensation polymerization of the components in the presence of the clay material.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific processes and conditions described, as specific processes and/or process conditions for processing polymer articles as such may, of course, vary. It is also understood that the terminology used herein is for the purpose of describing particular embodiments only and is not intended to be limiting.

It must also be noted that, as used in the specification and the appended claims, the singular forms "a," "an" and "the" included plural references unless the context clearly dictates otherwise.

Ranges may be expressed herein as from "about" or "approximately" one particular value and/or to "about" or "approximately" another particular value. When such a range is expressed, another embodiment includes from the one particular and/or to the other particular value. Similarly, when values are expressed as approximations, by use of the antecedent "about," it will be understood that the particular value forms another embodiment.

DEFINITIONS

Whenever used in this specification, the terms set forth shall have the following meanings:

"Layered clay," "layered clay material" or "clay material" shall mean any organic or inorganic material or mixtures thereof, such as a smectite clay mineral, which is in the form of a plurality of adjacent, bound layers. The layered clay comprises platelet particles and is typically swellable.

"Platelet particles," "platelets" or "particles" shall mean individual or aggregate unbound layers of the layered clay material. These layers may be in the form of individual platelet particles, ordered or disordered small aggregates of platelet particles (tactoids), and small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate" shall mean a layered clay material that includes an intercalant disposed between adjacent platelet particles or tactoids of the layered material to increase the interlayer spacing between the adjacent platelets and tactoids. In this invention, the intercalant is preferably a mixture of 2 or more different types of organic cations.

"Exfoliate" or "exfoliated" shall mean platelets dispersed predominantly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite(s)" or "nanocomposite composition(s)" shall mean a polymer or copolymer having dispersed therein a plurality of individual platelets obtained from a layered clay material.

"Matrix polymer" shall mean a thermoplastic or melt-processible polymer in which the platelet particles are dispersed to form a nanocomposite. In this invention, however, the platelet particles are predominantly exfoliated in the matrix polymer to form a nanocomposite.

DESCRIPTION OF THE EMBODIMENTS

The present invention relates generally to melt compounding processes to prepare polymer/clay nanocomposite compositions and to certain polymer/clay nanocomposite compositions wherein the clay particles are treated with a mixture of two or more organic cations, preferably organic cation salts. The polymer/clay nanocomposites of this invention exhibit an unexpectedly lower gas permeability, especially oxygen permeability, than other layered polymer/clay nanocomposites prepared by melt compounding processes. The process of this invention may be used to prepare a wide variety of polymer/clay nanocomposite compositions.

The prior art has defined the degree of separation of platelet particles based on peak intensity and basal spacing value, or lack of predominant basal spacing, as determined by X-ray analyses of polymer-platelet composites. Even though X-ray analysis alone often does not unambiguously predict whether or not the platelet particles are individually dispersed in the polymer, it can often allow quantification of the level of dispersion achieved. As such, X-ray analysis only provides information related to the well-ordered aggregates, which are only a small portion of the platelet particles present. Moreover, in polymer nanocomposites, X-ray analysis alone does not accurately predict the dispersion of the platelet particles in neither the polymer nor the resultant gas barrier improvement. TEM images of polymer-platelet composites show that platelet particles which are incorporated into at least one polymer exist in a variety of forms, including, but not limited to, individual platelets (the exfoliated state), disordered agglomerates of platelets, well ordered or stacked aggregates of platelets (tactoids), swollen aggregates of stacked platelets (intercalated tactoids), and aggregates of tactoids.

Without being bound by any particular theory, it is believed that the degree of improved gas barrier (permeability) depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the platelet particles representative of the bulk of the composite be exfoliated, and preferably be highly exfoliated, in the matrix polymer such that the majority, preferably at least about 75 percent and perhaps as much as at least about 90 percent or more of the platelet particles, be dispersed in the form of individual platelets and aggregates having a thickness in the shortest dimension of less than about 20 nm and preferably less than about 10 nm, as estimated from TEM images. Polymer-platelet nanocomposites containing more individual platelets and fewer aggregates, ordered or disordered, are most preferred. Significant levels of incomplete dispersion (i.e., the presence of large agglomerates and tactoids greater than about 20 nm) not only lead to an exponential reduction in the potential barrier improvements attributable to the platelet particles, but also can lead to deleterious affects to other properties inherent to polymer resins such as strength, toughness, and heat resistance.

Again, without being bound by a particular theory, it is believed that delamination of platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which a polymer chain has when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing. Heretofore, efforts to achieve a favorable enthalpy of mixing of platelet particles with melt processible polymers by pretreating the platelet particles (e.g., by cation exchange with alkyl ammonium ions) have been unsuccessful.

Regarding the present invention, it has been found that using clay intercalated with a mixture of organic cations while melt processing with a polymer gives good dispersion in a resulting nanocomposite, creating mostly individual platelet particles and improving the gas permeability of the nanocomposite. By using a mixture of organic cations (or mixed tethers), a balance of polar and non-polar groups may be achieved without conducting difficult syntheses, for example. That is, it is also easier to mix known and available cations (tethers) than to design and synthesize new ones.

Again without being bound by any particular theory, it is believed that given that a polymer chain typically comprises areas with different character (such as hydrophobicity, polarity, hydrogen bonding character, etc.), the use of a mixture of organic cations (mixed tethers) may help the polymer to achieve lower enthalpy of mixing by providing materials of different polarity for interaction with different parts of the polymer chain. To take advantage of this, the chain should have sufficient mobility and entropy to assume a conformation that is favorable, and expanding the clay gallery and delaminating into individual platelet particles helps this. An additional theory is that a mixture of cations (two or more tethers) might prefer to associate with a given polymer rather than with each other. The above rationales pertain primarily to the enthalpy. However, other theories are plausible.

In order to maximize the degree of exfoliation of the onium ion-treated clays in melt polymers, it is essential to have good compatibility between the matrix polymer (or oligomer, or polymer reactants) and the onium ions that are ion-exchanged at the clay platelet surface. In other words, the selection of the onium ions is based on the compatibility of the onium ions with the matrix monomers oligomers and polymers. Without being bound by any particular theory, it is believed that the formation of the mixed onium-ion exchanged clays enhances the compatibility of the gallery, between adjacent platelets, with the matrix polymer. Also, mixed onium ions could increase the compatibility range of a nanomer gallery with the matrix polymer. Mixed onium ion-intercalated clays can be used in the PET polymerization process to prevent the collapse of the exfoliated clay particles during the polymerization of ethylene glycol and DMT in the PET synthesis process. The polarity of the matrix polymer, e.g., PET, decreases as the degree of polymerization increases. The initial exfoliated clay in ethylene glycol may not be compatible with the PET matrix polymer using a single, high polarity onion ion. However, by incorporation of low polarity surfactants (onium ions) as well as higher polarity onium ions, in the clay galleries prior to exfoliation in ethylene glycol, gallery collapse (platelet re-alignment) is avoided during polymerization of the PET.

By using the mixed onium ion-exchanged clay, one can reduce the amount of certain high molecular weight onium ions, and facilitate the particle size reduction process (lower weight of onium ions bonded to the platelet surfaces). For instance, ETHOQUAD 18/25, an ethoxylated ammonium ion, has a high molecular weight. For a fully ETHOQUAD 18/25-exchanged Nanomer, the content of silicate in the Nanomer will be less than 50 weight percent. Also the fully onium ion-exchanged Nanomer is difficult to de-water. By using 50:50 molar ratio of the ETHOQUAD 18/25:ODA (octadecylammonium), the amount of ETHOQUAD 18/25 in the final treated clay is reduced by 50 weight percent, the onium ion(s)-intercalated clay be can be easily de-watered, and the onium ion-intercalated clay is in a dry powder form, rather than a tacky material. The mixed ETHOQUAD 18/25-ODA-clay has better dispersion and exfoliation in the matrix polymer after extrusion, than that of any single fully treated ETHOQUAD 18/25-intercalated clay and ODA-intercalated clay. The better exfoliation will be translated into better $O_2$ barrier properties.

More particularly, this invention relates to a polymer nanocomposite comprising a melt-processible polymer and up to about 25 weight percent of a swellable layered clay material which is intercalated with a mixture of at least two organic cations, preferably onium ions. The intercalated clay material has platelet particles, which are dispersed in the polymer. The polymer nanocomposite is preferably a polyester polymer or copolymer nanocomposite having an I.V. of at least 0.5 dL/g as measured in a mixture of 60 weight percent phenol and 40 weight percent 1,1,2,2-tetrachloroethane at a concentration of 0.5 g/100 ml (solvent) at 25° C.

In one embodiment, the process for manufacturing the polymer nanocomposite of this invention comprises (1) preparing the intercalated layered clay material and (2) incorporating the intercalated layered clay material in a polymer by melt processing the polymer with the intercalated layered clay material. Melt processing includes melt and extrusion compounding. Use of extrusion compounding to mix the intercalated clay and the polymer presents two advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin.

The first step of this invention is the preparation of the intercalated layered clay material by the reaction of a swellable layered clay with a mixture of organic cations, preferably ammonium compounds. The process to prepare the organoclay (intercalated clay) may be conducted in a batch, semi-batch, or continuous manner.

In another embodiment, the process of this invention comprises (i) preparing the intercalated layered clay material, (ii) adding the modified clay to a mixture of the components for forming the desired polymer and (iii) conducting the polycondensation polymerization in the presence of the modified clay. The molecular weight of the polymer material may be increased by any of a number of known approaches or by any combination of these approaches, e.g., chain extension, reactive extrusion, extrusion let-down, solid state polymerization or annealing, annealing under a flow of inert gas, vacuum annealing, let-down in a melt reactor, etc.

The resulting nanocomposite can then be processed into a desired barrier film or container with the processing procedures generally known in the art.

The nanocomposite of the present invention comprises less than about 25 weight percent, preferably from about 0.5 to about 20 weight percent, more preferably from about 0.5 to about 15 weight percent, and most preferably from about 0.5 to about 10 weight percent of clay. The amount of platelet particles is determined by measuring the amount of silicate residue in the ash of the polymer/platelet composition when treated in accordance with ASTM D5630-94. Useful clay materials include natural, synthetic, and modified phyllosilicates. Illustrative of such natural clays are smectite clays, such as montmorillonite, saponite, hectorite, mica, vermiculite, bentonite, nontronite, beidellite, volkonskoite, magadite, kenyaite, and the like. Illustrative of such synthetic clays are synthetic mica, synthetic saponite, synthetic hectorite, and the like. Illustrative of such modified clays are fluoronated montmorillonite, fluoronated mica, and the like. Suitable clays are available from various companies including Nanocor, Inc., Southern Clay Products, Kunimine Industries, Ltd., and Rheox.

Preferred clay materials are phyllosilicates of the 2:1 type having a cation exchange capacity of 0.5 to 2.0 milliequivalents per gram of mineral (meq/g). The most preferred clay materials are smectite clay minerals, particularly bentonite or montmorillonite, more particularly Wyoming-type sodium montmorillonite or Wyoming-type sodium bentonite.

Generally, the layered clay materials useful in this invention are an agglomeration of individual platelet particles that are closely stacked together like cards, in domains called tactoids. The individual platelet particles of the clays preferably have thickness of less than about 2 nm and diameter in the range of about 10 to about 3000 nm. Preferably, the clays are dispersed in the polymer so that most of the clay material exists as individual platelet particles, small tactoids, and small aggregates of tactoids. Preferably, a majority of the tactoids and aggregates in the polymer/clay nanocomposites of the present invention will have thickness in its smallest dimension of less than about 20 nm. Polymer/clay nanocomposite compositions with the higher concentration of individual platelet particles and fewer tactoids or aggregates are preferred.

Moreover, the layered clay materials are typically swellable free flowing powders having a cation exchange capacity between about 0.3 and about 3.0 meq/g, preferably 0.90 to 1.5 meq/g, and more preferably 0.95 to 1.25 meq/g. The clay may have a wide variety of exchangeable cations present in the galleries between the layers of the clay, including, but not limited to, cations comprising the alkaline metals (group IA), the alkaline earth metals (group IIA), and their mixtures. The most preferred cation is sodium; however, any cation or combination of cations may be used provided that most of the cations are exchanged for organic cations (onium ions) during the process of this invention.

Other non-clay materials having the above-described ion-exchange capacity and size, such as chalcogens, may also be used as the source of platelet particles under the present invention. Chalcogens are salts of a heavy metal and group VIA (O, S, Se, and Te). These materials are known in the art and do not need to be described in detail here.

The organic cation mixture used to intercalate the clay material of the nanocomposite of this invention is derived from organic cation salts, preferably onium salt compounds. Organic cation salts useful for the nanocomposite and process of this invention may generally be represented as follows:

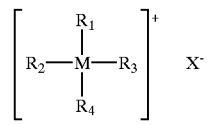

wherein M is either nitrogen or phosphorous; X is a halide, hydroxide, or acetate anion, preferably chloride and bromide; and $R_1$, $R_2$, $R_3$, and $R_4$ are independently organic and oligomeric ligands or may be hydrogen.

Examples of useful organic ligands include, but are not limited to, linear or branched alkyl groups having 1 to 22 carbon atoms, more preferably 1 to 12 carbon atoms, aralkyl groups which are benzyl and substituted benzyl moieties including fused-ring moieties having linear chains or branches of 1 to 100 carbon atoms, more preferably at least one ligand with 12 or more carbons, in the alkyl portion of the structure, aryl groups such as phenyl and substituted phenyl including fused-ring aromatic substituents, beta, gamma unsaturated groups having six or less carbon atoms, and alkyleneoxide groups having 2 to 6 carbon atoms, more preferably 3 to 5 carbon atoms. Examples of useful oligomeric ligands include, but are not limited to, poly(alkylene oxide), polystyrene, polyacrylate, polycaprolactone, and the like.

Particularly useful organic cations for the organic cation mixture of this invention include, but are not limited to, alkyl ammonium ions, such as dodecyl ammonium, octadecyl ammonium, bis(2-hydroxyethyl) octadecyl methyl ammonium, octadecyl benzyl dimethyl ammonium, tetramethyl ammonium, and the like, and alkyl phosphonium ions such as tetrabutyl phosphonium, trioctyl octadecyl phosphonium, tetraoctyl phosphonium, octadecyl triphenyl phosphonium, and the like.

Illustrative examples of suitable polyalkoxylated ammonium compounds include the hydrochloride salts of polyalkoxylated amines available under the trade name JEFFAMINE (available from Huntsman Chemical), namely, JEFFAMINE-506, which is an oligooxyethlene amine with number average molecular weight of about 1100 g/mol, and JEFFAMINE 505 which is an oligooxypropylene amine with number average molecular weight of about 640 g/mol, and those available under the trade name ETHOQUAD or ETHOMEEN (available from Akzo Chemie America), namely, ETHOQUAD 18/25, which is octadecyl methyl bis(polyoxyethylene[15]) ammonium chloride, and ETHOMEEN 18/25, which is octadecyl bis(polyoxyethylene[15])amine, wherein the numbers in brackets refer to the total number of ethylene oxide units. The most preferred organic cations for use in polyesters, such as polyethylene terephthalates, are polyalkoxylated ammonium compounds.

Numerous methods to modify layered clays with organic cations are known, and any of these may be used in the process of this invention.

One embodiment of this invention is the modification of a layered clay with a mixture of organic cation salts by the process of dispersing a layered clay into hot water, most preferably from 50 to 80° C., adding the organic cation salts separately or adding a mixture of the organic cation salts (neat or dissolved in water or alcohol) with agitation, then blending for a period of time sufficient for the organic cations to exchange most of the metal cations present in the galleries between the layers of the clay material. Then, the organically modified layered clay material is isolated by methods known in the art including, but not limited to, filtration, centrifugation, spray drying, and their combinations.

It is desirable to use a sufficient amount of the organic cation salts to permit exchange of most of the metal cations in the galleries of the layered particle for organic cations; therefore, at least about 0.5 equivalent of total organic cation salts is used and up to about 3 equivalents of organic cation salts can be used. It is preferred that about 0.5 to 2 equivalents of organic cation salts be used, more preferable about 1.0 to 1.5 equivalents. It is often desirable, but not required, to remove most of the metal cation salts and most of the excess organic cation salts by washing and other techniques known in the art.

The particle size of the resulting organoclay is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

Although not preferred, the clays may be further treated for the purposes of aiding exfoliation in the composite and/or improving the strength of the polymer/clay interface. Any treatment that achieves the above goals may be used.

Examples of useful treatments include intercalation with water-soluble or water-insoluble polymers, organic reagents or monomers, silane compounds, metals or organometallics, and/or their combinations.

Treatment of the clay can be accomplished prior to the addition of a polymer to the clay material, during the dispersion of the clay with a polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the mixed organic cation-intercalated clays include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy (polyethyleneoxy)propyl heptamethyl trisiloxane, octadecyl dimethyl (3-trimethoxysilylpropyl) ammonium chloride and the like.

If desired, a dispersing aid may be present during or prior to the formation of the composite by melt mixing for the purposes of aiding exfoliation of the treated or untreated swellable layered particles into the polymer. Many such dispersing aids are known, covering a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compounds as possible, the amounts of dispersing aids and/or pretreatment compounds may be as much as about 8 times the amount of the platelet particles.

Any melt-processable polymer or oligomer may be used in this invention. Illustrative of melt-processible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the preferred polymers are linear or nearly linear, polymers with other architectures, including branched, star, cross-linked and dendritic structures, may be used if desired.

The preferred polymers include those materials that are suitable for use in the formation of multilayer structures with polyesters, and include polyesters, polyamides, polyethylene-co-vinyl alcohols (such as EVOH) and similar or related polymers and/or copolymers. The preferred polyester is poly(ethylene terephthalate) (PET) or a copolymer thereof. The preferred polyamide is poly(m-xylylene adipamide).

Suitable polyesters include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The matrix polymer of this invention may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, terephthalic acid, naphthalene-2,6-dicarboxylic acid, cyclohexanedicarboxylic acid, cyclohexanediacetic acid, diphenyl-4,4'-dicarboxylic acid, phenylenedi(oxyacetic acid), succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, and more preferably up to about 15 mole percent of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerythritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art. Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole% of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- orpara-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly (hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminonanoic acid (nylon 9), polyundecane-amide (nylon 11), polyaurylactam (nylon 12), poly (ethyleneadipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly (octamethyleneadipamide) (nylon 8,6), poly (decamethylene-adipamide) (nylon 10,6), poly (dodecamethylene-adipamide) (nylon 12,6) and poly (dodecamethylenesebacamide) (nylon 12,8).

The most preferred polyamides include poly(m-xylylene adipamide), polycapramide (nylon 6) and poly (hexamethylene-adipamide) (nylon 6,6). Poly(m-xylylene adipamide) is a preferred polyamide due to its availability, high barrier, and processability.

The polyamides are generally prepared by processes which are well known in the art.

Although not necessarily preferred, the polymers of the present invention may also include additives normally used in polymers. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

This invention also relates to articles prepared from the nanocomposite material of this invention, including, but not limited to film, sheet, pipes, tubes, profiles, molded articles, preforms, stretch blow molded films and containers, injection blow molded containers, extrusion blow molded films and containers, thermoformed articles and the like. The containers are preferably bottles.

The bottles and containers of this invention provide increased shelf storage life for contents, including beverages and food that are sensitive to the permeation of gases. Articles, more preferably containers, of the present invention display a gas transmission or permeability rate (oxygen, carbon dioxide, water vapor) at least 10% lower (depending on clay concentration) than that of similar containers made from clay-free polymer, resulting in correspondingly longer product shelf life provided by the container. Desirable values for the sidewall modulus and tensile strength may also be maintained.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as polyethylene terephthalate and its copolymers.

In another embodiment of this invention, the polymer-clay nanocomposite and the molded article or extruded sheet may be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced. Since the high barrier material is often the most expensive component in multilayer packaging, a reduction in the amount of this material used can be quite beneficial. With the nanocomposite layer being sandwiched between two outer polymer layers, the surface roughness is often considerably less than for a monolayer nanocomposite material. Thus, with a multilayer approach, the level of haze is reduced.

EXAMPLES

The following examples are put forth so as to provide those of ordinary skill in the art with a more complete disclosure and description of how the resin compositions claimed herein are made and evaluated. They are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

Examples 1–3 and Comparative Example 1

30 grams of a refined Wyoming-type sodium montmorillonite with cation exchange capacity of about 0.95 meq/g available from Southern Clay Products was added to 1.0 L of hot (about 85° C.) distilled water then stirred for about 2 minutes in a Henschel high-speed multi-blade mixer with a heater attached to maintain the temperature at about 85° C. while mixing. An aqueous solution of 28.5 meq of hydrochloric acid and 28.5 meq of amine from mixtures (shown as Examples 1–3) of JEFFAMINE-506 (EOA) and JEFFAMINE-505 (POA) as listed in Table 1 was added to the Henschel mixer and blended for about 2 minutes.

Comparative Example 1, also listed in Table 1, also utilizes the same process described above and below except that only JEFFAMINE-506 (EOA) was used as an intercalant.

A white precipitate formed almost immediately after the addition of the ammonium salt to the clay slurry. The white precipitate was separated by use of a Beckman Model J-6B Centrifuge, washed with a 50:50 v/v mixture of distilled water and isopropanol with mixing in the Henschel mixer, filtered, then dried at 60° C. for at least 24 hours. The particle size of the dried clay was reduced to about 10–15 micron using a hammer mill and then a jet mill. The WAXS basal spacing and silicate content (ash) were determined for the clay product as listed in Table 1.

TABLE 1

| Examples | Tether Mole Ratio EOA/POA | Grams of EOA | Grams of POA | Ash of Intercalated Clay (wt %) | Basal Spacing of Intercalated Clay (nm) |
| --- | --- | --- | --- | --- | --- |
| Comparative Example 1 | 100/0 | 32.06 | 0 | 73.4 | 1.40 |
| 1 | 75/25 | 21.88 | 4.56 | 72.4 | 1.38 |
| 2 | 50/50 | 15.01 | 9.12 | 72.1 | 1.38 |
| 3 | 25/75 | 7.50 | 13.68 | 72.9 | 1.42 |

4.3 grams of the ammonium-intercalated clay was dry mixed with 395.7 grams PET 9921 (commercially available from Eastman Chemical Company), which is a polyethylene terephthalate containing about 3.5 mole percent of 1,4-cyclohexanedimethanol and having I.V. of about 0.72 dL/g. The dry mixture was dried in a vacuum oven overnight at 120° C. then extruded at a temperature of about 275° C. on a Leistritz Micro 18 mm twin screw extruder using general purpose screws with a RPM of 200. The extrudate was cooled on an air belt and then pelletized as it exited the die.

Films were prepared by compression molding using a Pasadena hydraulic press with an applied pressure of about 3000 lbs. at a temperature of 280° C. with a molding time of about 1.15 minutes. To prevent sticking of the material to the molding plates, Teflon coated aluminum foil was used. To achieve a target thickness, a 10-mil thick shim was used. The molded films were immediately quenched in ice water to obtain an amorphous sample, thereby eliminating the effect of crystallinity on the measured gas permeability. The permeability results of the films are presented in Table 2, including the control (neat PET 9921, available from Eastman Chemical Company) and the comparative example, which does not utilize a mixture of organic cations.

TABLE 2

| Examples | Tether Mole Ratio EOA/POA | Ash (wt %) | Oxygen Permeability (cc-mil/100 in²-day-atm) |
|---|---|---|---|
| Comparative Example 1 | 100/0 | 3.14 | 8.0 |
| 1 | 75/25 | 2.73 | 7.4 |
| 2 | 50/50 | 2.95 | 6.6 |
| 3 | 25/75 | 2.89 | 7.8 |
| PET 9921 Control | n/a | 0 | 10.2 |

Table 2 shows that clays treated with the mixture of anunonium ions provides polyester nanocomposites with significantly improved oxygen permeability compared to unmodified PET (PET 9221 control). The unmodified PET does not contain any platelet particles. Moreover, the unmodified PET does not contain platelet particles treated with a mixture of onium ions according to the present invention.

In addition, and even more particularly surprising, the results of Table 2 illustrate that treating clay (used in a polymer nanocomposite) with a mixture of different types of ammonium ions (EOA/POA) improves oxygen permeability compared to clay treated with just one ammonium ion (EOA).

A comparison of Examples 1 and 3, for example, shows that a clay treated with a 50/50 ratio of a mixture of ammonium ions (EOA/POA) has an oxygen permeability of 6.6 cc-mil/100 in²-day-atm while a clay treated with one ammonium ion (100/0 of EOA/POA) has an oxygen permeability of 8.0 cc-mil/100 in²-day-atm. This result is particularly surprising in that both clays have been treated with an ammonium ion; however, the clay treated with the ammonium ion mixture provides unexpectedly improved results.

Comparisons of Examples 1 and 2 (75% EOA/25% POA) and Examples 1 and 4 (25% EOA/75% POA) also indicate improved barrier properties of films made from nanocomposites treated with mixtures of organic cations over a film prepared from a nanocomposite treated with only one organic cation.

The following examples further illustrate the formation of mixed onium ion treated clays.

ETHOQUAD 18/25-ODA Clay System 100 g of purified sodium montmorillonite (Na-CWC) with cation exchange capacity of 1.4 meq/g available from Nanocor, Inc. was added to 4.0 L of hot (85° C.) distilled water to form a clay slurry and the clay slurry was stirred by a paddle mixer until all clay solids were dispersed. The mixed onium ion solutions were prepared by mixing an ETHOQUAD 18/25-water solution and ODA in a 1:1 molar ratio in HCL solution. The mixed onium ion solution was added to the clay slurry. A clay precipitate formed immediately upon mixing. The total mixture was mixed and maintained at 85° C. for about 2 hours. The water was removed by filtration. The obtained precipitate was washed twice before drying in an oven at 120° C. The dried clay was ground with a mechanical grinder, and further ground by jet-mill or air-classifier-mill to reduce the particle size to about 10 to 15 microns. Finally, the ground samples were analyzed by powder X-ray diffraction. The following tables 2 and 3 summarize the composition and basal spacing of the mixed ETHOQUAD 18/25-ODA treated clays with different molar ratios of ETHOQUAD 18/25 and ODA.

TABLE 2

| Example | E-18/25:ODA | Ash of clay (wt %) | $D_{001}$ of Treated Clay |
|---|---|---|---|
| 5 | 100:0 | 41.2 | 36.0 |
| 6 | 75:25 | 46.0 | 34.0 |
| 7 | 50:50 | 52.0 | 31.0 |
| 8 | 25:75 | 60.0 | 27.0 |
| 9 | 0:100 | 72.0 | 22.0 |

Q182–Q142 System

Q182 and Q142 are quaternary ammonium surfactants available from Tomah Products, Inc. Q182 has a straight $C_{18}$ chain, while Q142 has a straight $C_{11}$ chain and ether linkage with a $C_3$ chain linked to the nitrogen atom. The combinatin of different chain length and polarity surfactants will create a multiple onium ion-intercalated clay which has better compatibility with the matrix polymer, particularly when the matrix polymer undergoes polymerization or further polymerization while in contact with the intercalated and/or exfoliated intercalates containing a plurality of ion-exchanged onium ions of different polarity. The combination of different chain length and polarity onium ions will create an intercalated clay which has a better compatibility range for a host of matrix polymers, while preventing re-alignment and collapse (will provide better dispersibility) of exfoliated clay platelets. The basal spacing data of the single onium ion-exchanged Q142 or Q182 onium ions alone, and mixed onium ion-Q142/Q182-clays are shown below in Table 3 as Examples 10, 11 and 12.

TABLE 3

| Example | Q142/Q182 (molar) | Ash of Clay (wt %) | $D_{001}$ of Treated Clay |
|---|---|---|---|
| 10 | 100:0 | 72.7 | 20.2 |
| 11 | 50:50 | 69.4 | 25.1 |
| 12 | 0:100 | 64.2 | 28.0 |

Throughout this application, various publications are referenced. The disclosures of these publications in their entireties are hereby incorporated by reference into this application in order to more filly describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer-clay nanocomposite having an improved gas barrier comprising:
   (i) a melt-processible matrix polymer, and incorporated therein,
   (ii) a clay-organic cation intercalate comprising a layered clay material intercalated with a mixture of at least two organic cations,
   wherein
   a) at least 75 percent of the layered clay material is dispersed in the form of individual platelet particles and tactoids having a thickness of less than or equal to 20 nm in the matrix polymer, b) the organic cations comprise a mixture of polyalkoxylated ammonium ions and the polyalkoxylated ammonium ions are derived from an oligooxyethylene amine, an oligooxypropylene amine, an octadecyl methyl bis(polyoxyethylene[15]) ammonium salt, or octadecyl bis(polyoxyethylene[15])amine, wherein the numbers in brackets are the average of the total number of ethylene oxide units.

2. The nanocomposite of claim 1, wherein the melt-processible matrix polymer comprises a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, or a copolymer thereof, or a mixture thereof.

3. The nanocomposite of claim 1, wherein the melt-processible matrix polymer comprises a polyester, polyamide, polyethylene-co-vinyl alcohol, or a copolymer thereof, or a mixture thereof.

4. The nanocomposite of claim 1, wherein the melt-processible matrix polymer is poly(m-xylylene adipamide), EVOH, or a copolymer thereof, or a mixture thereof.

5. The nanocomposite of claim 1, wherein the melt-processible matrix polymer is poly(ethylene terephthalate) or a copolymer thereof.

6. The nanocomposite of claim 1, comprising greater than zero to about 25 weight percent of the layered clay material.

7. The nanocomposite of claim 1, comprising from about 0.5 to about 15 weight percent of the layered clay material.

8. The nanocomposite of claim 1, comprising from about 0.5 to about 10 weight percent of the layered clay material.

9. The nanocomposite of claim 1, wherein the layered clay material is a natural, synthetic or modified phyllosilicate.

10. The nanocomposite of claim 1, wherein the layered clay material comprises montmorillonite, saponite, hectorite, mica, vermiculite, bentonite, nontronite, beidellite, volkonskoite, saponite, magadite, kenyaite, or a mixture thereof.

11. The nanocomposite of claim 1, wherein the clay material comprises Wyoming montmorillonite or Wyoming bentonite.

12. The nanocomposite of claim 1, wherein the clay material is a free flowing powder having a cation exchange capacity from about 0.9 to about 1.5 meq/g.

13. The nanocomposite of claim 1, wherein at least 90 percent of the layered clay material is dispersed in the form of individual platelet particles and tactoids having a thickness of less than or equal to 10 nm in the matrix polymer.

14. The nanocomposite of claim 1, wherein the organic cations are derived from onium salt compounds.

15. The nanocomposite of claim 14, wherein the onium salt compounds comprise ammonium salt compounds.

16. The nanocomposite of claim 1, wherein the melt-processible matrix polymer comprises poly(ethylene terephthalate) or a copolymer thereof, the layered clay material comprises Wyoming montmorillonite or Wyoming bentonite, and the mixture of at least two organic cations comprises a hydrochloride salt of oligooxyethylene amine with a number average molecular weight of about 1100 g/mol and a hydrochloride salt of oligooxypropylene amine with a number average molecular weight of about 640 g/mol.

17. The nanocomposite of claim 1, having an I.V. of at least 0.5 dL/g as measured in a mixture of 60 weight percent phenol and 40 weight percent 1,1,2,2-tetrachloroethane at a concentration of 0.5 g 100 ml (solvent) at 25° C.

18. An article prepared from the nanocomposite of claim 1.

19. The article of claim 18 in the form of film, sheet, pipe, an extruded article, a molded article or a molded container.

20. The article of claim 18 in the form of a bottle.

21. The article of claim 18, having a gas permeability which is at least 10 percent lower than that of an article formed from a clay-free polymer.

22. An article having a plurality of layers wherein at least one layer is formed from the nanocomposite of claim 1.

23. The article of claim 22, wherein the nanocomposite is disposed intermediate to two other layers.

24. The article of claim 22, having one or more layers of a structural polymer.

25. A process for preparing a polymer-clay nanocomposite having an improved gas barrier comprising the steps of:
(i) preparing an intercalated layered clay material by reacting a swellable layered clay material with a mixture of at least two organic cations, and
(ii) incorporating the intercalated layered clay material in a matrix polymer by melt processing the matrix polymer with the intercalated clay,
wherein
a) at least 75 percent of the layered clay material is dispersed in the form of individual platelet particles and tactoids having a thickness of less than or equal to 20 nm in the matrix polymer, and
b) the organic cations comprise a mixture of polyalkoxylated ammonium ions and the polyalkoxylated ammonium ions are derived from an oligooxyethylene amine, an oligooxypropylene amine, an octadecyl methyl bis(polyoxyethylene[15]) ammonium salt, or octadecyl bis(polyoxyethylene[15])amine, wherein the numbers in brackets are the average of the total number of ethylene oxide units.

26. The process of claim 25, wherein step (ii) is conducted by a batch mixing or a melt compounding extrusion process.

27. A polymer-clay nanocomposite made by the process of claim 25.

28. An article prepared from the nanocomposite of claim 27.

29. The article of claim 28 in the form of film, sheet, pipe, an extruded article, a molded article or a molded container.

30. The article of claim 28 in the form of a bottle.

31. A process for preparing a polymer-clay nanocomposite having an improved gas barrier comprising the steps of:
(i) preparing an intercalated layered clay material by reacting a swellable-layered clay material with a mixture of at least two organic cations,
(ii) adding the clay material to components for forming a polymer, and
(iii) conducting the polycondensation polymerization of the components in the presence of the clay material to form a matrix polymer,
wherein
a) at least 75 percent of the layered clay material is dispersed in the form of individual platelet particles and tactoids having a thickness of less than or equal to 20 nm in the matrix polymer, and
b) the organic cations comprise a mixture of polyalkoxylated ammonium ions and the polyalkoxylated ammonium ions are derived from an oligooxyethylene amine, an oligooxypropylene amine, an octadecyl methyl bis(polyoxyethylene[15]) ammonium salt, or octadecyl bis(polyoxyethylene[15])amine, wherein the numbers in brackets are average of the total number of ethylene oxide units.

32. A polymer-clay nanocomposite made by the process of claim 31.

33. An article prepared from the nanocomposite of claim 32.

34. The article of claim 33 in the form of film, sheet, pipe, an extruded article, a molded article or a molded container.

35. The article of claim 33 in the form of a bottle.

36. The process of claim 25, wherein at least two of the organic cations comprise a mixture of polyalkoxylated ammonium ions and the polyalkoxylated ammonium ions are derived from a hydrochloride salt of oligooxyethylene amine, a hydrochloride salt of oligooxypropylene amine, octadecyl methyl bis(polyoxyethylene[15]) ammonium chloride, or octadecyl bis(polyoxyethylene[15])amine, wherein the numbers in brackets are the total number of ethylene oxide units.

37. The process of claim 31, wherein at least two of the organic cations comprise a mixture of polyalkoxylated ammonium ions and the polyalkoxylated ammonium ions are derived from a hydrochloride salt of oligooxyethylene amine, a hydrochloride salt of oligooxypropylene amine, octadecyl methyl bis(polyoxyethylene[15]) ammonium chloride, or octadecyl bis(polyoxyethylene[15])amine, wherein the numbers in brackets are the total number of ethylene oxide units.

38. The nanocomposite of claim 1, wherein the molar ratio of the two organic cations is from about 75/25 to about 25/75.

39. The process of claim 25, wherein the molar ratio of the two organic cations is from about 75/25 to about 25/75.

40. The process of claim 31, wherein the molar ratio of the two organic cations is from about 75/25 to about 25/75.

41. The process of claim 25, wherein at least 90 percent of the layered clay material is dispersed in the form of individual platelet particles and tactoids having a thickness of less than or equal to 10 nm in the matrix polymer.

42. The article of claim 28, having a gas permeability which is at least 10 percent lower than that of an article formed from a clay-free polymer.

* * * * *